(12) United States Patent
Amano

(10) Patent No.: US 7,929,103 B2
(45) Date of Patent: Apr. 19, 2011

(54) DISPLAY AND METHOD OF MANUFACTURING DISPLAY

(75) Inventor: Toru Amano, Kanagawa (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 11/554,658

(22) Filed: Oct. 31, 2006

(65) Prior Publication Data
US 2007/0132934 A1    Jun. 14, 2007

(30) Foreign Application Priority Data

Nov. 2, 2005  (JP) ................ P2005-319095

(51) Int. Cl.
G02F 1/1339    (2006.01)
(52) U.S. Cl. ...................................... 349/153
(58) Field of Classification Search .......... 349/153
See application file for complete search history.

(56) References Cited

U.S. PATENT DOCUMENTS

| | | | | |
|---|---|---|---|---|
| 6,118,509 A | * | 9/2000 | Miyake | 349/153 |
| 6,219,126 B1 | * | 4/2001 | Von Gutfeld | 349/153 |
| 7,161,645 B2 | * | 1/2007 | Wachi | 349/106 |
| 2002/0044232 A1 | * | 4/2002 | Cho et al. | 349/43 |

FOREIGN PATENT DOCUMENTS

JP    07-209657    8/1995

* cited by examiner

*Primary Examiner* — Uyen-Chau N Le
*Assistant Examiner* — Hoang Tran
(74) *Attorney, Agent, or Firm* — SNR Denton US LLP

(57) ABSTRACT

Disclosed herein is a display including a drive substrate and an opposite substrate adhered to each other, with a sealant therebetween, in the periphery of a display region provided in a central area of the drive substrate, wherein the gap between the drive substrate and the opposite substrate in an application region of the sealant is narrower than the gap in an adjacency region adjacent to and on the display region side of the application region.

20 Claims, 4 Drawing Sheets

DISPLAY AND METHOD OF MANUFACTURING DISPLAY

CROSS REFERENCES TO RELATED APPLICATIONS

The present invention contains subject matter related to Japanese Patent Application JP 2005-319095 filed in the Japanese Patent Office on Nov. 2, 2005, the entire contents of which being incorporated herein by reference.

BACKGROUND OF THE INVENTION

1. Field of the Invention

The present invention relates to a display having a drive substrate and an opposite substrate adhered to each other with a sealant therebetween, and a method of manufacturing the display.

2. Description of the Related Art

A liquid crystal panel constituting a liquid crystal display is produced by adhering two glass substrates, silicon substrates or the like and sealing a liquid crystal material between the substrates. A sealant for adhering the substrates to each other is supplied as a viscose liquid containing an epoxy resin, an acrylic resin or the like as a main component, and is applied to the substrate by a screen printing machine or a dispenser. The substrate coated with the sealant is adhered to the other substrate, a pressure is applied to the substrates until a predetermined gap is realized between the substrates, and then the sealant is cured by heat or UV rays.

For reducing the size of an apparatus on which to mount a liquid crystal panel or for increasing the yield of the panel from the substrate and enhancing productivity, it may be necessary to reduce the size of the portion called frame in the periphery of the display area of the liquid crystal panel, i.e., the portion to which the sealant is applied. On the other hand, for maintaining the adhesive force and moisture resistance, it may be necessary to secure a sealing width of not less than a predetermined value, so that there is a limit to the reduction in the sealing width. Therefore, in a panel with a narrow frame, the sealant and the display area are laid out close to each other (refer to Japanese Patent Laid-open No. 2003-287760).

SUMMARY OF THE INVENTION

However, the displays according to the related art in which substrates are adhered to each other with a sealant as above-mentioned have the following problems. The end face of the sealant, which is a viscose liquid, would spread wavingly when the pressure is applied, and it is very difficult to stop the spreading of the sealant end face in a straight line form at an aimed position. Where the sealant and the display area are close to each other, there would be increased dangers of defective display due to oozing out of the sealant into the display region, irregular display due to mis-orientation of liquid crystals in the vicinity of the sealant, or defective display in a peripheral part of the display region due to oozing out of an impurity from the sealant or the like causes.

Thus, there is a need for proving a liquid crystal display in which the position of the sealant is controlled by the substrate shape, the frame region is narrow, and which is free of irregular display and high in reliability. According to an embodiment of the present invention, there is provided a display including a drive substrate and an opposite substrate adhered to each other, with a sealant therebetween, in the periphery of a display region provided in a central area of said drive substrate, wherein the gap between the drive substrate and the opposite substrate in an application region of the sealant is narrower than the gap in an adjacency region adjacent to and on the display region side of the application region.

Here, the gap between the drive substrate and the opposite substrate in the application region of the sealant is so sized that the sealant can be transferred by capillarity, whereas the gap between the drive substrate and the opposite substrate in the adjacency region is so sized that the sealant may not be transferred by capillarity.

In the embodiment of the present invention as just-mentioned, the sealant when sandwiched between two substrates tends to spread easily toward the narrower gap between the substrates by capillarity and to spread difficultly toward the wider gap. In order to utilize this phenomenon, in the present invention, the gap between the substrates in the application region of the sealant is set to be narrower than the gap between the substrates in the adjacent region, resulting in the condition where the sealant will spread only in the application region when a pressure is exerted thereon.

According to another embodiment of the present invention, there is provided a method of manufacturing a display having a drive substrate and an opposite substrate adhered to each other, with a sealant therebetween, in the periphery of a display region provided in a central area of the drive substrate, wherein in applying the sealant to the drive substrate or the opposite substrate and laying the substrates on each other, the gap between the drive substrate and the opposite substrate in an application region of the sealant is set to be narrower than the gap in an adjacency region adjacent to and on the display region side of the application region.

Here, in order to set the gap in the application region to be narrower in the adjacency region, at least one of the drive substrate and the opposite substrate corresponding to the application region may be preliminarily provided with a control film, or at least one of the drive substrate and the opposite substrate corresponding to the adjacency region may be preliminarily provided with a recessed part.

In the embodiment of the present invention as just-mentioned, the gap between the substrates in the application region of the sealant is set to be narrower than the gap between the substrates in the adjacency region. Therefore, when the drive substrate and the opposite substrate are adhered to each other under the condition where the sealant has been applied to the application region, the sealant will gradually spread by capillarity along the application region where the gap between the substrates is narrower. This results in the condition where the sealant spreads only in the application region when a pressure is exerted thereon.

Therefore, according to an embodiment of the present invention, it is possible to control the sealing position accurately, and to provide a liquid crystal display which is free of defective display and is high in reliability. In addition, since the sealant and the display area can be set closer to each other, it is possible to further narrow the frame, and to provide a panel small in outer size. Moreover, since the yield of the panel from the substrate is increased, it is possible to realize an enhanced productivity and a reduced cost.

DETAILED DESCRIPTION OF THE PREFERRED EMBODIMENTS

Figure 1A:
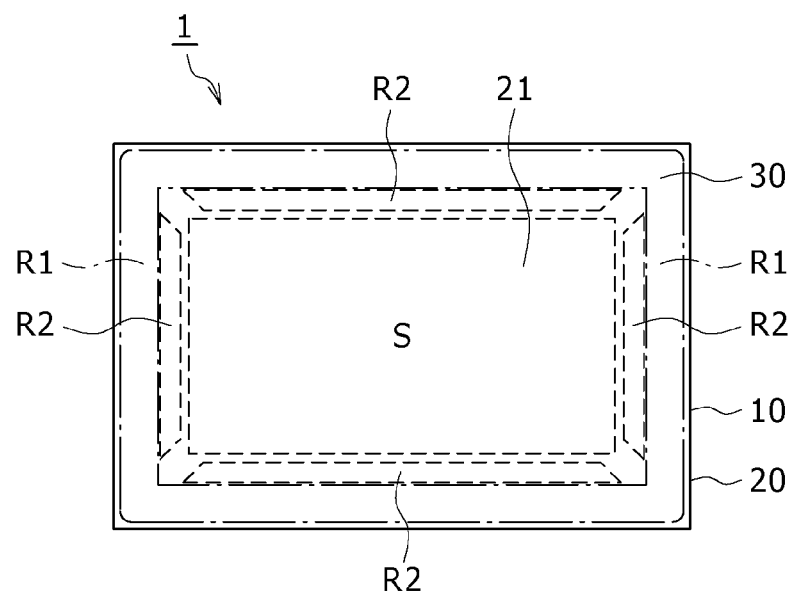
FIGS. 1A and 1B are schematic views illustrating a display according to a first embodiment of the present invention.

Now, embodiments of the present invention will be described below referring to the drawings. Incidentally, while the following description will be made by taking a liquid crystal display as an example, the present invention is applicable to other displays than the liquid crystal display insofar as two substrates are adhered to each other with a sealant therebetween.

Figure 1B:
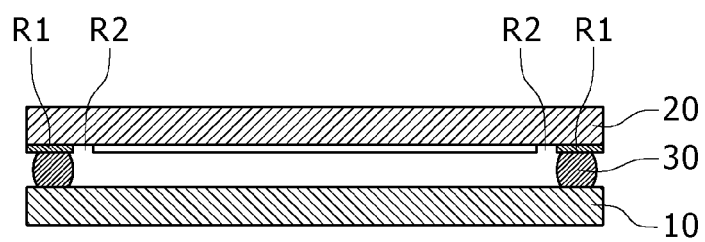
Figure 2:
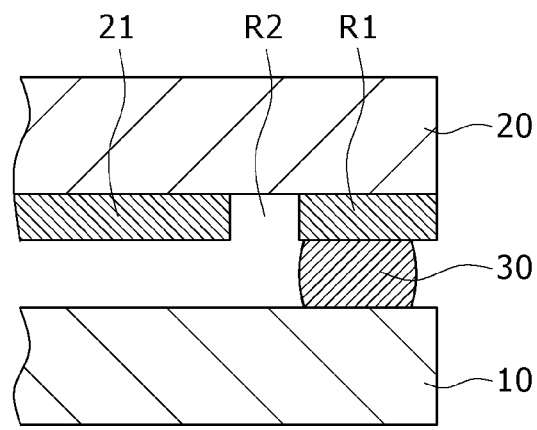
FIG. 2 is an enlarged sectional view of a main part of the display according to the first embodiment of the present invention.

FIGS. 1A and 1B are schematic views illustrating a display according to a first embodiment of the present invention, in which FIG. 1A is a plan view and FIG. 1B is a sectional view. In addition, FIG. 2 is an enlarged sectional view of a main part of the display according to the first embodiment. The display 1 has a configuration in which a drive substrate 10 having a glass substrate or semiconductor substrate provided with pixel-driving TFTs (Thin Film Transistors) and the like arranged in a matrix pattern and an opposite substrate 20 provided with a transparent electrode 21 and the like are adhered to each other with a sealant 30 therebetween, and the gap between the substrates is charged with liquid crystals (not shown).

A TFT formed part provided in a central area of the drive substrate 10 constitutes a display region S, and an application region R1 to which to apply the sealant 30 is provided so as to surround the periphery of the display region S. In the display 1, in the first embodiment, the gap between the drive substrate 10 and the opposite substrate 20 in the application region R1 of the sealant 30 is set to be narrower than the gap in adjacency regions R2 adjacent to and on the display region S side of the application region R1.

Specifically, the transparent electrode 21, on the inner side of the application region R1 of the sealant 30, on the opposite substrate 20 is removed by a photolithography step or the like, to form steps. Usually, the transparent electrode 21 is formed uniformly on the opposite substrate 20. In this embodiment, in the adjacent regions R2 on the display region S side of the application regions R1 of the sealant 30 is partly removed, resulting in the condition where the transparent electrode 21 is left in the display region S and in the application region R1 of the sealant 30. This results in the condition where when the drive substrate 10 and the opposite substrate 20 are laid on each other, the gap between the substrates in the application region R1 of the sealant 30 is narrower than the gap between the substrates in the adjacency regions R2.

When the sealant 30 is sandwiched between the substrates under this condition, the sealant 30 spreads toward the narrower gap between the substrates by capillarity, but does not spread toward the wider gap between the substrates, so that the sealant 30 can be prevented from spreading toward the display region S side.

In manufacturing the display 1, first, the transparent electrode 21 in the adjacency region R2 on the opposite substrate 20 as above-mentioned is preliminarily removed partly, and the sealant 30 is applied to the application region R1 of the drive substrate 10 or the opposite substrate 20. The application of the sealant 30 is conducted, for example, by a dispenser system or a screen printing system. Then, the sealant 30 is prebaked, and thereafter the sealant-coated substrate is adhered to the other substrate.

At the time of adhesion, application of a predetermined pressure and heating at a predetermined temperature are conducted, to press down the sealant 30 and to form a predetermined gap between the substrates. The gap is determined by spacers preliminarily mixed into the sealant 30. When a pressure is exerted on the substrates thus adhered to each other, the sealant 30 spreads. In this case, the gap between the substrates is wider in the areas where the transparent electrode 21 has been removed, so that the sealant 30 does not spread into the wider-gap areas, but spreads toward the narrower gap between the substrates, i.e., spreads gradually along the application region R1 of the sealant 30. This ensures that the sealant 30 stops at the boundaries of the pattern of the transparent electrode 21, and will not spread toward the display region S side.

Since the sealant 30 stops at the boundaries of the pattern of the transparent electrode 21, the sealant 30 does not flood out to the display region S side, so that controllability of the sealant 30 is enhanced. Therefore, the sealant 30 and the display region S can be laid out closer to each other, and the region of the so-called frame on the outside of the display region S can be reduced in size.

The width of the application region R1 of the sealant 30 is 0.5 to 2.0 mm, preferably 0.9 to 1.3 mm, the gap between the substrates in the application region R1 is not more than 10 μm, preferably about 3.5 μm, and the width of the parts of the adjacency regions R2 which are deprived of the transparent electrode 21 is about 0.7 mm. Besides, the sealant 30 may be, for example, a heat-curable epoxy adhesive (for example, WORLD ROCK 780, produced by Kyoritsu Chemical & Co., Ltd.), and a prebaking temperature of about 90° C. and a pressing temperature of about 120 to 150° C. may be adopted.

Figure 3:
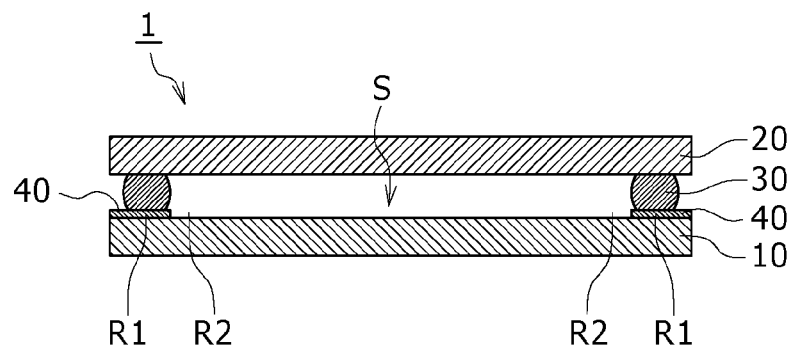
FIG. 3 is a schematic sectional view illustrating a second embodiment of the present invention.
Figure 4A:
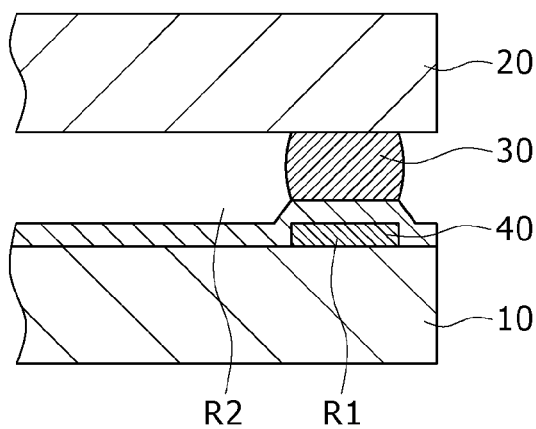
FIGS. 4A and 4B are enlarged sectional views of a main part in the second embodiment of the present invention.
Figure 4B:
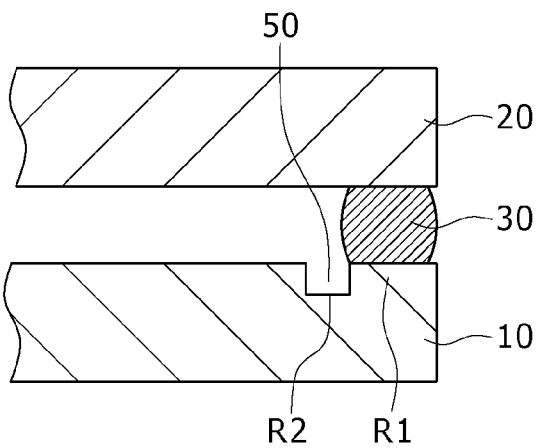

FIG. 3 is a schematic sectional view illustrating a second embodiment of the present invention, and FIGS. 4A and 4B are enlarged sectional views of a main part in the second embodiment. As shown in FIG. 3, a display 1 according to the second embodiment, like in the first embodiment, has a configuration in which the gap between a drive substrate 10 and an opposite substrate 20 in an application region R1 of a sealant 30 is set to be narrower than the gap in adjacency regions R2 adjacent to and on the display region S side of the application region R1. This configuration is realized by setting the thickness (the thickness inclusive of a film) of the drive substrate 10 in the application region R1 of the sealant 30 to be greater than the thickness in the adjacency regions R2. For enlarging the thickness of the substrate, it may be contemplated to provide a control film 40 on the drive substrate 10 (see FIG. 4A) or to provide the drive substrate 10 with a recessed part 50 (see FIG. 4B).

In the display 1, the drive substrate 10 having a glass substrate or semiconductor substrate provided with pixel-driving TFTs and the like in a matrix pattern and the opposite substrate 20 provided with a transparent electrode 21 and the like are adhered to each other with a sealant 30, and the gap between the substrates is charged with liquid crystals (not shown).

In the display 1 according to the second embodiment, as shown in FIG. 4A, the control film 40 for thickness control is provided in the application region R1 of the sealant 30 on the drive substrate 10 side. The control film 40 is formed, for example, by a method in which a photosensitive resin or an inorganic film of vacuum-deposited $SiO_2$ or the like is patterned by a photolithography step or the like. Incidentally, another film may be formed on the control film 40 as shown in FIG. 4A, but it is necessary that the adjacency regions R2 are smaller in height than the application region R1.

When the display 1 is manufactured by use of this drive substrate 10, the thickness of the drive substrate 10 is increased in the area where the control film 40 is formed, so that when the substrates are adhered to each other through the sealant 30 therebetween, the gap between the substrates in the application region R1 of the sealant 30 is narrower than the gap between the substrates in the adjacency regions R2. This ensures, like in the above-mentioned example, that the sealant does not spread into the area of the wider gap between the substrates, but gradually spreads toward the narrower gap between the substrate, i.e., spreads along the application region R1 where the control film 40 has been formed.

As a result, the sealant 30 stops at boundaries of the pattern of the control film 40, and does not spread toward the display region S side, so that controllability of the sealant 30 is enhanced.

In an example shown in FIG. 4B, the drive substrate 10 is provided with the recessed parts 50 in the adjacency regions R2. Therefore, the thickness of the substrate in the application region R1 of the sealant 30 is greater, as compared with the areas of the recessed parts 50. When the display 1 is manufactured by use of this drive substrate 10, the gap between the substrates is narrower in the application region R1 of the sealant 30 than in the adjacency regions R2 where the recessed parts 50 are formed. As a result, the sealant 30 does not spreads into the areas of the wider gap between the substrates, but gradually spreads toward the narrower gap between the substrates, i.e., spreads along the application region R1. This ensures that the sealant 30 stops spreading at the boundaries between the application region R1 of the sealant 30 and the recessed parts 50 in the adjacency regions R2.

In both of the above examples, the sealant 30 does not spread to the inner side from the application region R1 but stops at the boundaries between the application region R1 and the adjacency regions R2, so that the sealant 30 does not flood out to the display region S side, and controllability of the sealant 30 is enhanced. Therefore, the sealant 30 can be laid out closer to the display region S, and the region of the so-called frame on the outside of the display region S can be reduced in size.

Besides, while examples in which the control film 40 or the recessed parts 50 are provided on the drive substrate 10 side have been shown in the second embodiment illustrated in FIGS. 4A and 4B, the control film 40 or the recessed parts 50 may be provided on the opposite substrate 20 side. In addition, the control film 40 or the recessed parts 50 may be provided the sides of both the drive substrate 10 and the opposite substrate 20.

Figure 5A:
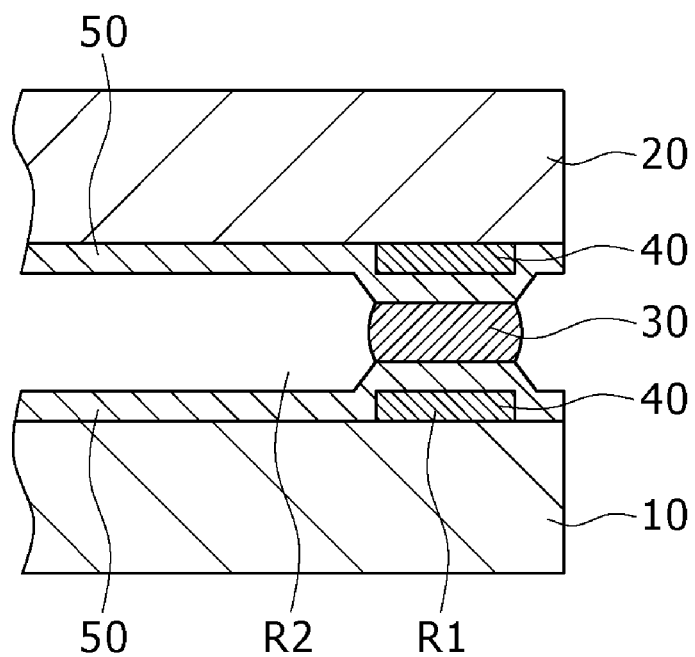
FIGS. 5A and 5B are schematic sectional views showing an example in which both substrates are provided with control films and recessed parts, respectively.
Figure 5B:
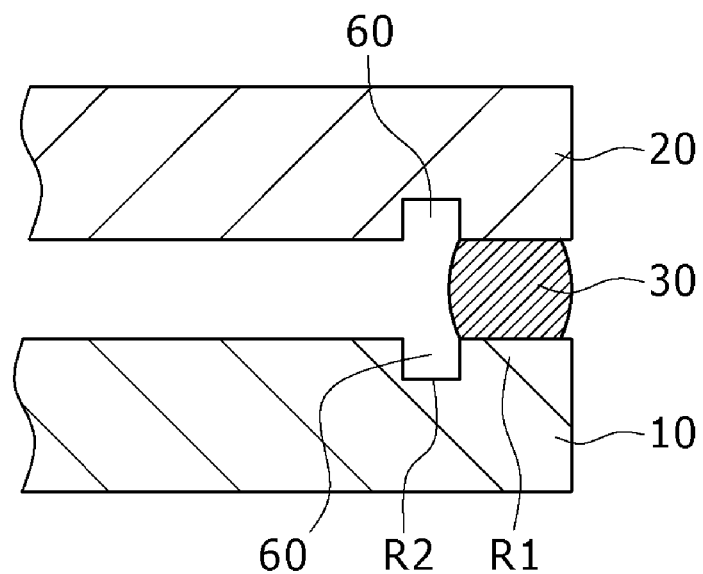

FIGS. 5A and 5B are schematic sectional views showing examples in which both substrates are each provided with a control film or recessed parts, in which FIG. 5A shows the example in the case of the control film, and FIG. 5B shows the example in the case of the recessed parts. In any case, the control films 40 and the recessed parts 50 are provided at opposed positions of both substrates. This ensures that the difference in the gap between the substrates between an application region R1 and adjacency regions R2 is greater, as compared with that in the case shown in FIGS. 4A and 4B, whereby controllability of the spread of a sealant 30 can be further enhanced.

Here, in the display according to the second embodiment, the width of the application region R1 of the sealant 30 is 0.5 to 2.0 mm, preferably 0.9 to 1.3 mm, the gap between the substrates in the application region R1 is not more than 10 µm, preferably about 3.5 µm, and the width of the recessed parts 50 formed in the adjacency regions R2 is about 0.7 mm. In addition, the sealant 30 may be, for example, a heat-curable epoxy adhesive (for example, WORLD ROCK 780 (product name), produced by Kyoritsu Chemical & Co., Ltd.), and a prebaking temperature of about 90° C. and a pressing temperature of about 120 to 150° C. may be adopted.

Figure 6:
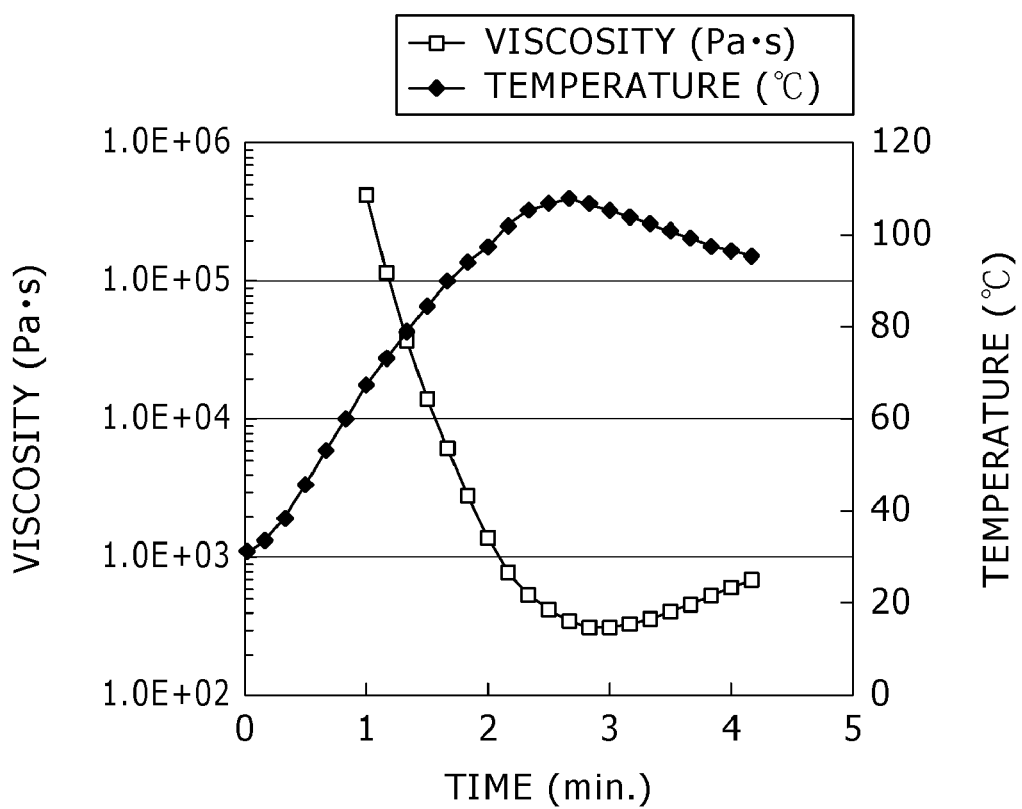
FIG. 6 is a diagram for illustrating variations in viscosity and temperature of a sealant with heating time.

FIG. 6 is a diagram illustrating the variations in viscosity and temperature of a sealant with heating time. In order to prevent the spreading of the sealant to the display region side by setting the gap between the substrates in the application region to be narrower than the gap between the substrates in the adjacency regions and utilizing the capillarity of the sealant as above-mentioned, control of the gap between the substrates and control of the viscosity of the sealant are important.

In this embodiment, use is made of a sealant which shows a viscosity variation and a temperature variation as shown in FIG. 6 in the case where the gap between the substrates in the application region is set to 3.5 µm. Specifically, in the case of this sealant, the temperature reaches 107° C. after about 2.6 min from the start of heating, the viscosity is $3.21 \times 10^2$ Pa·s after about three minutes from the start of heating, and thereafter the viscosity is gradually raised due to the start of curing of the sealant. This indicates that the sealant spreads only in the application region by capillarity according to the lowering in viscosity and, thereafter, is cured gradually.

Since the sealant does not spread out of the application region during the adhesion of the drive substrate and the opposite substrate to each other, it is possible to provide a display in which the spreading-out of the sealant into the display region is restrained, irregular display due to the influence of an impurity or impurities contained in the sealant is not generated and which is high in reliability. In addition, since controllability of the sealant is enhanced, a margin region which might be provided taking into account of the spreading-out of the sealant is not needed to be large, so that the application region and the display region can be laid out closer to each other, and there is no need for preparing an unnecessary frame region. Therefore, it is possible to achieve a display with a narrowed frame.

It should be understood by those skilled in the art that various modifications, combinations, sub-combinations and alterations may occur depending on design and other factors insofar as they are within the scope of the appended claims or the equivalents thereof.

What is claimed is:
1. A display comprising:
 a first substrate and a second substrate adhered to each other;
 a sealant applied to an application region between said first substrate and said second substrate;
 a display region provided in a central area of said first substrate on a side of said application region;
 an electrode provided in said display region and said application region of said sealant, the electrode having a step in an adjacency region that is between said display region and said application region of said sealant;
 a first gap between said first substrate and said second substrate in said application region of said sealant; and
 a second gap adjacent to said first gap in said adjacency region, said second gap separating the display region from said application region,
 wherein said first gap in said application region is narrower than said second gap in said adjacency region.

2. The display as set forth in claim 1, further comprising:
a control film to determine a size of said first gap formed on at least one of said first substrate and said second substrate .

3. The display as set forth in claim 1, further comprising:
a recessed part formed on at least one of said first substrate and said second substrate.

4. The display as set forth in claim 1, further comprising:
a region on an inner side of said sealant of the gap filled with a liquid crystal, the region between said first substrate and said second substrate.

5. A method of manufacturing a display having a first substrate and a second substrate adhered to each other, a sealant applied to an application region between said first substrate and said second substrate, a display region provided in a central area of said first substrate on a side of said application region, an electrode provided in said display region and said application region of said sealant, said method comprising the step of:
removing a portion of the electrode to form a step in an adjacency region that is between said display region and said application region of said sealant; and
in applying said sealant to said first substrate or said second substrate and laying said substrates on each other, setting a first gap in said application region of said sealant to be narrower than a second gap in said adjacency region.

6. The method of manufacturing the display as set forth in claim 5, further comprising the step of:
preliminarily providing at least one of said first substrate and said second substrate corresponding to said application region with a control film in order to set the first gap in said application region to be narrower than the first gap in said adjacency region.

7. The method of manufacturing the display as set forth in claim 5, further comprising the step of:
preliminarily providing at least one of said first substrate and said second substrate corresponding to said adjacency region with a recessed part in order to set the first gap in said application region to be narrower than the second gap.

8. The method of manufacturing the display as set forth in claim 5, further comprising the step of:
after said first substrate and said second substrate are adhered to each other, filling a region, on the inner side of said sealant, of the first gap between said first substrate and said second substrate with a liquid crystal.

9. The display as set forth in claim 1, wherein the sealant is only applied within the first gap.

10. The display as set forth in claim 1, wherein the second gap separates the display region from any sealant.

11. The display as set forth in claim 1, wherein the application region forms at least a portion of said second gap.

12. The display as set forth in claim 1, further comprising:
recesses formed in said first substrate and said second substrate.

13. The method of manufacturing the display as set forth in claim 5, wherein in the step of applying the sealant, the sealant is only applied within the first gap such that the sealant only extends to an area within the first gap and no sealant is between the second gap and the display region.

14. The method of manufacturing the display as set forth in claim 5, wherein the second gap separates the display region from any sealant.

15. The method of manufacturing the display as set forth in claim 5, wherein the application region forms at least a portion of said second gap.

16. The method of manufacturing the display as set forth in claim 5, further comprising the step of:
forming recesses in said first substrate and said second substrate.

17. The display as set forth in claim 1, wherein the electrode in the application region is electrically connected to the electrode in the display region.

18. The method of manufacturing the display as set forth in claim 5, wherein the electrode in the application region is electrically connected to the electrode in the display region.

19. The display as set forth in claim 1, wherein the step is formed by removing a portion of the transparent electrode by photolithography.

20. The method of manufacturing the display as set forth in claim 5, wherein the portion of the electrode is removed photolithography.

* * * * *